United States Patent [19]

Hammond et al.

[11] Patent Number: 5,232,644
[45] Date of Patent: Aug. 3, 1993

[54] PROCESS FOR COLORED POLYETHYLENE MOLDINGS

[76] Inventors: Daniel E. Hammond, 18000 Cottontail Pl.; John D. Hammond, 2436 Coraview Lane, both of Rowland Heights, Calif. 91748

[21] Appl. No.: 868,106

[22] Filed: Apr. 14, 1992

[51] Int. Cl.⁵ ............................................. B29C 41/04
[52] U.S. Cl. ............................... 264/73; 264/122; 264/245; 264/310; 264/349; 264/141
[58] Field of Search ............ 264/73, 245, 300, 310, 264/349, 109, 122, 141, 40.4

[56] References Cited

U.S. PATENT DOCUMENTS

| | | | |
|---|---|---|---|
| 3,484,262 | 12/1969 | Hahn | 264/109 |
| 3,871,629 | 3/1975 | Hishida | 264/40.4 |
| 3,974,114 | 8/1976 | Sowa | 264/310 |
| 4,252,762 | 2/1981 | Stevenson | 264/245 |
| 4,668,461 | 5/1987 | Needham | 264/310 |
| 4,906,428 | 3/1990 | Kelly | 264/310 |
| 4,923,657 | 5/1990 | Gembinski et al. | 264/73 |

FOREIGN PATENT DOCUMENTS 49-90752  8/1974  Japan ................................ 264/310

Primary Examiner—Jeffery Thurlow
Assistant Examiner—Mathieu Vargot
Attorney, Agent, or Firm—Willie Krawitz

[57] ABSTRACT

Polyethylene resin compositions containing mottled colors and a process for their production, includes forming a colored resin by hot melting the resin together with an appropriate color in an extruder. The colored resin is reground to about 35 mesh, and then blended with a flow additive such as zinc stearate, and preferably an anti-static powder. The blended resin is then rotationally molded along with other, different colored resin particles to obtain a final multi-colored, mottled appearance in the molded product. Different color combinations such as granite, green, red, brown, grey, sandstone, etc., can be produced, without the different colors intermixing or bleeding into each other, while still maintaining the integral molded product form.

6 Claims, No Drawings

PROCESS FOR COLORED POLYETHYLENE MOLDINGS

BACKGROUND OF THE INVENTION

This invention relates to producing molded articles of polyethylene having a mottled or multi-colored appearance.

Prior art plastic molded compositions have been produced which incorporate 'effect colors' in molded articles to give a multi-colored or mottled colored appearance. However, both the 'effect colors' and the incorporation process itself tend to be expensive, and the molded article may have structural anomalies due to dissimilarities between the coloring materials and the polyethylene resin. For example, polypropylene and other resins are not suitable for the process and composition of this invention because they tend to be too brittle. Also, it is important to ensure that if a multi-colored effect is used, the colors will not bleed into each other, or simply form a uniformly colored mixture.

Consequently, a process and raw materials which are both inexpensive are desired to produce a resin composition which result in a molded product having a multi-colored or mottled appearance. The process should be capable of being implemented with existing equipment, and the resin composition should have good shelf life properties. Also, the coloring process and composition should not result in the colors bleeding into each other, and the molded product should not exhibit structural anomalies due to different colors being used.

THE INVENTION

According to the invention, there is provided dry mixes and molded compositions of polyethylene having a multi-colored or mottled appearance and a process for their production which comprises formulating a hot melt of the colored resin in an extruder, and converting the hot melt colored resin into colored particles having a size range of about 30-40 mesh.

The colored resin particles are then blended with a mold release agent such as a metallic fatty acid ester of, say calcium or zinc stearate, and an anti-static agent, if required. Finally, batches of two or more different colored resin particles in the desired color scheme and containing the mold release agent and, if required, the anti-static agent, are rotationally cast into a molded product.

It has been found, unexpectedly, that instead of forming a molded product having a single color which would normally result from a mixture of individual colored particles, the molded product retains the mottling appearance or multi-coloring of the individual colored particles. Also, the individual particles retain their color stability in the molded product, with little if any bleeding, mixing or smearing of one color into an adjacent color.

DESCRIPTION OF THE PREFERRED EMBODIMENT

The polyethylene resins employed may include high, medium and low density materials, such as Phillip's "MARLEX".

Mold release agents which may be employed include metallic C12-C18 fatty acid esters such as zinc, calcium and magnesium stearates, palmitates, myristates, laurates, etc., with zinc stearate being preferred.

Anti-static agents may include monoglycerides and amines, which are used in a concentration of about 0.05%-2%. Typical amines include tertiary ethoxylated amines, soya amines polyethoxylated cocoamines, and mixed fatty amines; quaternary ammonium compounds; monoglycerides; and mixtures thereof. Anti-static agents are preferably employed in low humidity conditions, but their use is otherwise not critical.

Both the mold release agents and the anti-static agents have the property of exuding to the surface of the particles following the blending process due to their incompatibility with the host resin. It will be appreciated that the colors employed should not interact with either the anti-static agent or the mold release agent.

A four pound batch of multi-colored, molded polyethylene material was produced by initially successively forming in an extruder, a hot melt of 1.5 pounds of white colored polyethylene, a hot melt of 1.25 pounds grey colored polyethylene; and, a hot melt of 1.25 pounds of black colored polyethylene.

The colored polyethylene extrudates were then separately ground to about 35 mesh, the preferred size, and the tumble or spin blended (to produce a uniform mixture) with thirty-five (35) mesh size of five (5) grams of anti-static powder, together with eight (8) grams of zinc stearate (about 325 mesh size), which improves flow properties. The excess zinc stearate subsequently migrated to the surface of the blend.

The colored granules were then rotationally molded into a commercial product. This molded product had a black, grey and white mottled or multi-colored appearance, similar to granite, while retaining the same color and appearance as the individual original granules used in the mixture. Also, the surface of the molded product had a textured, raised feel and appearance, rather than being smooth, which is typical of injection molded products.

We claim:

1. A process for producing molded articles of polyethylene resin having a multi-colored or mottled appearance, comprising the steps of:
   a.) forming separate, compounded, hot resin melts of various uniform colors, and converting the color melts into a granule or bead form having a size range of about 30-40 mesh;
   b.) dry blending various colors of the powdered or bead resins with a mold release compound selected consisting of metallic C12-C18 fatty acid esters;
   c.) allowing the said mold release compound to exude to the surface of the resin powder or beads; and,
   d.) rotationally casting the said colored resin beads into a mottled or multicolored molded article, while retaining the same color and appearance as the original resin granules or beads, and without color intermixing, smearing or bleeding.

2. The process of claim 1, in which the mold release agent is selected from the group consisting of metallic stearates, myristates, palmitates and laurates.

3. The process of claim 2, in which the resin particle size is about 35 mesh, the mold release agent is zinc stearate, and an anti-static agent is added during blending.

4. The process of claim 3, in which the anti-static agent is selected from the group consisting of quaternary ammonium compounds, monoglycerides and amines.

5. The process of claim 4, in which the anti-static agent is selected from the group consisting of tertiary ethoxylated amines, polyethoxylated coco amines, soya amines and mixtures thereof.

6. The process of claim 5, in which the blending process comprises tumble blending.

* * * * *